(12) United States Patent
Haeberer

(10) Patent No.: US 8,857,160 B2
(45) Date of Patent: Oct. 14, 2014

(54) RESERVOIR FOR ACCOMMODATING AN AQUEOUS SOLUTION

(75) Inventor: Rainer Haeberer, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 679 days.

(21) Appl. No.: 13/132,177

(22) PCT Filed: Nov. 16, 2009

(86) PCT No.: PCT/EP2009/065190
§ 371 (c)(1),
(2), (4) Date: Jun. 1, 2011

(87) PCT Pub. No.: WO2010/078991
PCT Pub. Date: Jul. 15, 2010

(65) Prior Publication Data
US 2011/0232271 A1 Sep. 29, 2011

(30) Foreign Application Priority Data
Jan. 9, 2009 (DE) .......................... 10 2009 000 094

(51) Int. Cl.
*F01N 3/00* (2006.01)
*F01N 3/20* (2006.01)

(52) U.S. Cl.
CPC ............... *F01N 3/2066* (2013.01); *Y02T 10/24* (2013.01); *F01N 2610/02* (2013.01); *F01N 2610/1406* (2013.01)
USPC ............................... 60/295; 60/301; 220/564

(58) Field of Classification Search
CPC ......... Y02T 10/24; Y02T 10/20; Y02T 10/44; Y02T 10/126; B01D 53/9418; B01D 53/96; B01D 2251/2062; B01D 2251/2067; F01N 3/2066; F01N 3/208; F01N 2610/02; F01N 2610/1453; F01N 2610/1406; F01N 2610/10; F01N 2610/14; F01N 2610/1473

USPC ............ 60/285, 286, 295, 301; 220/564, 501, 220/503, 505
See application file for complete search history.

(56) References Cited

U.S. PATENT DOCUMENTS 6,026,974 A * 2/2000 Burt ............................. 220/564
6,223,526 B1 * 5/2001 Wissler et al. .................. 60/286
(Continued)

FOREIGN PATENT DOCUMENTS

| DE | 102007025348 A1 * | 12/2008 | ............... F01N 3/20 |
|---|---|---|---|
| DE | 102009036260 A1 * | 2/2011 | |
| DE | 102011113192 A1 * | 3/2013 | |
| EP | 1645452 | 4/2006 | |
| EP | 1645452 A1 * | 4/2006 | |
| EP | 1974975 | 10/2008 | |
| FR | 2884788 | 10/2006 | |
| JP | 2005291086 | 10/2005 | |
| JP | 2005291086 A * | 10/2005 | ............... F01N 3/08 |
| WO | 9902825 | 1/1999 | |
| WO | 03016687 | 2/2003 | |
| WO | 2006045672 | 4/2006 | |
| WO | WO 2006045672 A1 * | 5/2006 | ............... F01N 3/20 |
| WO | WO 2010078991 A1 * | 7/2010 | |

OTHER PUBLICATIONS

PCT/EP2009/065190 International Search Report, Dated Aug. 2, 2010.

*Primary Examiner* — Thomas Denion
*Assistant Examiner* — Patrick Maines
(74) *Attorney, Agent, or Firm* — Michael Best & Friedrich LLP

(57) ABSTRACT

The invention relates to a dosing system (10) for introducing a reducing agent (18), especially urea or an aqueous urea solution, into an exhaust gas system of an internal combustion engine. The dosing system (10) comprises a reservoir (12, 14) for accommodating a stock in the reducing agent (18), a delivery unit (32), a level sensor (50) and a dosing module (38). The reservoir (40) is a standard reservoir integrated into a vehicle-specific component (60), especially a fuel tank (68).

10 Claims, 5 Drawing Sheets

(56) References Cited

U.S. PATENT DOCUMENTS

| | | | |
|---|---|---|---|
| 7,017,336 B2* | 3/2006 | Stiermann | 60/286 |
| 7,647,767 B2* | 1/2010 | Osaku et al. | 60/286 |
| 2004/0025498 A1* | 2/2004 | Lambert et al. | 60/286 |
| 2007/0209631 A1 | 9/2007 | Campenon et al. | |
| 2007/0277502 A1* | 12/2007 | Duvinage et al. | 60/274 |
| 2008/0007918 A1 | 1/2008 | Lederer et al. | |
| 2010/0282758 A1* | 11/2010 | Gaden et al. | 220/565 |
| 2011/0036079 A1* | 2/2011 | Capelle et al. | 60/298 |
| 2011/0036847 A1* | 2/2011 | Tam et al. | 220/564 |

* cited by examiner

RESERVOIR FOR ACCOMMODATING AN AQUEOUS SOLUTION

BACKGROUND OF INVENTION

DE 101 39 139 A1 relates to a dosing system for dosing a reducing agent for exhaust gas aftertreatment. The reducing agent is, in particular, urea or an aqueous urea solution. This is used to reduce nitrogen oxides contained in the exhaust gas from an internal combustion engine. A delivery device for delivering the reducing agent from a storage container to an exhaust pipe carrying the exhaust gas is provided. The dosing apparatus furthermore comprises a metering device for the dosed feeding of reducing agent into the exhaust pipe, the delivery device comprising a pump and the metering device comprising a dosing valve with an outlet element. The metering device is set up for mounting close to or on the exhaust pipe, thus allowing the outlet element to project into the exhaust pipe, and the delivery device is set up in such a way that it is mounted on or in the storage container. The delivery device and the metering device form separate modules connected by a connecting line.

DE 10 2004 051 746 A1 relates to a reservoir module for a reducing agent and to a dosing system. According to this solution, a reservoir module housing is provided, and a dosing system for dosing a reducing agent into an exhaust system is arranged within a reservoir chamber of the reservoir module housing. According to this solution, the dosing system is designed as a compact built-in module.

DE 10 2006 027 481 A1 relates to a vehicle reservoir for a liquid reducing agent, especially a urea solution. The vehicle reservoir for accommodating an aqueous urea solution for reducing nitrogen oxides in the exhaust gas from internal combustion engines is manufactured from plastic. The vehicle reservoir advantageously has a functional unit which comprises at least one pump, at least one pressure control valve, at least one internal reservoir with an integrated electric heating system and at least one suction line. The functional unit is advantageously inserted into an opening in the reservoir and seals off the latter in the manner of a cap.

The reducing agent is transported from the reservoir to the dosing module in a conduit by a pump, which represents the delivery module. Pressure control is exercised on the actuator side by means of the speed of the pump motor and, in the feedback branch, by means of a pressure sensor. A permanent return flow restrictor in the vicinity of the pressure generator gives the hydraulic system a high pressure stability from the point of view of control. To exclude possible damage to the system in the event of freezing, the system is ventilated, when the engine is switched off, by reversing the polarity of the delivery pump and simultaneously opening the dosing module to the exhaust gas. In the event of freezing, the reducing agent expands by about 10% of its volume.

The reservoir holding the reducing agent contains an anti-surge pot, in the lower area of which an electric heating element is generally positioned. To be able to ensure readiness for dosing within an acceptable time and with a minimum heating power at low outside temperatures, heating is restricted to the area of the anti-surge pot. This is achieved by virtue of the fact that the plastic wall of the anti-surge pot as it were insulates the contents of the pot from the overall contents of the reservoir. The entire heating energy is thus available for thawing the volume of reducing agent held in the anti-surge pot.

In order to manage with a single fill of the reducing agent reservoir between two service intervals, the reducing agent reservoir generally holds between 20 and 30 liters of reducing agent. The driver thus has no contact with the reducing agent, the reservoir being refilled during the service. However, implementing a 30-liter reservoir for reducing agent within today's bodies is extremely difficult, given the ever smaller amount of installation space available. All reservoirs and the geometries thereof are highly project-specific and this entails a large variety as regards the shape of the reservoir, the shape and size of the anti-surge pot, the heating elements used and the level sensors. Moreover, the reservoirs require individually tailored thermal insulation and fastening means. This is associated with a very wide variety of different versions, and this in turn entails very high costs.

Owing to constantly increasing fuel prices and a pressing requirement for $CO_2$ reduction, a reduction in fuel consumption will be indispensable in future. Since the removal of nitrogen oxides from the exhaust gas of internal combustion engines by means of an aqueous urea solution as a reducing agent allows optimum design of the internal combustion engine with regard to fuel consumption, the SCR (selective catalytic reduction) method will play a preeminent role. Owing to the saving in fuel consumption required for $CO_2$ reduction, carrying 30 liters of reducing agent in the motor vehicle at all times is no longer acceptable. The result will be that there will be a drastic reduction in the size of the reservoir for the reducing agent and the reservoir will accommodate a volume of reducing agent of the order of between 2 liters and 10 liters and will have to be refilled by the driver at intervals of about 2000 to 5000 km, depending on operating conditions. Refilling by the driver will be accepted because, in particular, an external refilling facility for refilling the reducing agent reservoir is already being provided nowadays.

SUMMARY OF THE INVENTION

According to the solution proposed according to the invention, the dosing system for introducing reducing agent into the exhaust gas from an internal combustion engine comprises a reducing agent reservoir having a reducing agent volume of between 2 liters and 10 liters. Owing to the relatively small capacity of the reservoir, the geometry thereof allows a greater degree of freedom as regards the utilization of the small amount of installation space available by a standard system. The reducing agent reservoir, which holds a volume of reducing agent of the order of between 2 liters and 10 liters, is designed as a standard reservoir which can be employed in a manner which takes account of different installation space requirements. Moreover, the system, which has a large number of shared components, will comprise a heating element of standard configuration and a standard level sensor system. Owing to the small amount of reducing agent, of the order of between 2 liters and 10 liters, there is no longer any need for measures designed to counteract the sloshing of the reducing agent within the reservoir, making it possible to omit the anti-surge pot and thereby achieve a large cost saving by virtue of the fact that standard components with multiple uses are employed. The reservoir geometry of the small reservoir accommodating the reducing agent is preferably dimensioned in such a way, with a capacity of between 2 liters and 10 liters, that said reservoir is cylindrical in construction, with the height of the cylinder exceeding the diameter of the cylinder.

Owing to its reduced size, the relatively small reservoir for accommodating the reducing agent can be produced by an inexpensive plastics injection molding process or, alternatively, by a centrifugal plastics molding process. Expensive plastics blow molding processes that were used previously, which entail very high tooling costs, are no longer required, thus making it possible to achieve a cost saving in the production of the reducing agent reservoir component as well.

As an alternative way of manufacturing the standard reservoir accommodating the reducing agent, it is also possible, by virtue of the small volume and simple shape thereof, to manufacture the reducing agent reservoir from stainless steel as an alternative to the plastics injection molding process and the centrifugal plastics molding process.

In another embodiment of the concept underlying the invention, it is conceivable for the small standard reservoir accommodating the reducing agent to be combined with other components. Thus, there is the possibility of combining the small standard reservoir with some other vehicle-specific component. This other vehicle-specific component must be modified in such a way that the small standard reservoir can be accommodated in a corresponding installation space. Possible vehicle-specific components for integration of the small standard reservoir accommodating the reducing agent would be the wash water reservoir or even the fuel tank of the vehicle, for example.

The possibility of combining the fuel tank and the small standard reservoir accommodating the reducing agent with one another appears particularly advantageous, especially because $CO_2$ reduction and the associated reduction in fuel consumption will entail a reduction in the size of the fuel tank currently used.

Thus, for example, the fuel tank could have a top opening into which the small standard reducing agent reservoir is simply inserted. As in the case of the fuel tank, closure of the standard reservoir for accommodating the reducing agent could be accomplished by means of a cap with a seal and a large plastic nut. In another variant embodiment, the fuel tank could have a cylindrical indentation in its continuous skin, into which the relatively small standard reducing agent reservoir can be inserted. The outer skin of the fuel tank could furthermore already contain the smaller-sized standard reservoir for accommodating the reducing agent, thus again enabling both the reservoir and the tank to be produced economically by the plastics blow molding process.

Combining the fuel tank with a standard reservoir accommodating the reducing agent offers the possibility of heating the smaller-sized standard reservoir accommodating the reducing agent by means of the warm return from the fuel injection system and consequently thawing said reservoir.

BRIEF DESCRIPTION OF THE DRAWINGS

The invention is described in greater detail below with reference to the drawing, in which.

DETAILED DESCRIPTION

Figure 1:
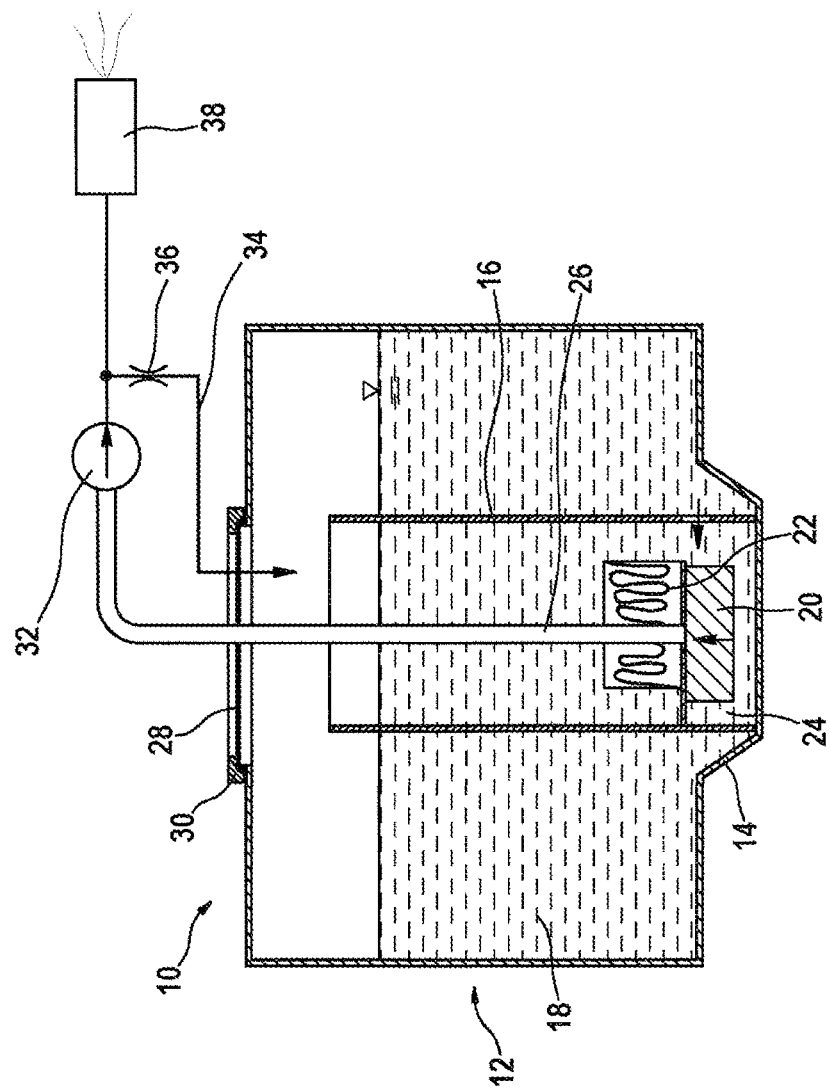
FIG. 1 shows a dosing system in an embodiment known from the prior art.

The illustration in FIG. 1 shows a schematic representation of a dosing system known from the prior art for dosing a reducing agent into the exhaust tract of an internal combustion engine.

A dosing system 10 comprises a reservoir 12, which has a trough 14 at the bottom thereof. Inside the reservoir 12 there is an anti-surge pot 16 for limiting the sloshing movements of a reducing agent 18. A lower pot 24, which is situated within the trough 14 at the bottom of the reservoir 12, is provided in the lower area of the anti-surge pot 16. A heating element 22 is let into the lower pot 24. Passing through this heating element is a suction lance 26, at the suction end of which, in the area of the lower pot 24, is a filter 20. Via this filter 20, reducing agent 18 is drawn in from the lower pot 24 below the anti-surge pot 16 by means of a delivery unit 32. The suction lance 26 extends through the heating element 22, the anti-surge pot 16 and a reservoir cap 28.

The delivery unit 32, which is preferably designed as an electrically operated pump, is accommodated in the line of the suction lance 26. By means of said delivery unit, reducing agent 18 is fed to a dosing module 38 designed as an injection valve via the suction lance 26. Branching off downstream of the delivery unit 32 is a return 34, in which there is a restrictor 36.

The reservoir 12 for accommodating the reducing agent 18 is closed at the top thereof by a cap 28, which is secured on the reservoir 12 by means of a screwed joint 30, for example. Via the opening in the top of the reservoir 12, said opening being closed by the cap 28, the components within the reservoir 12, for instance the anti-surge pot 16, the heating element 22, the filter 20, the lower pot 24 and the suction lance 26, are mounted within the reservoir 12 accommodating the reducing agent 18.

The reservoir 12 illustrated in FIG. 1 is one which accommodates a volume of reducing agent 18 of the order of 20 liters or more. In order to restrict the sloshing movements of the reducing agent 18 while the vehicle is moving, the anti-surge pot 16 is mounted within the reservoir 12 as illustrated in FIG. 1, said pot in this case being seated on a lower pot 24. The lower pot 24, for its part, is arranged in a trough-shaped depression 14 at the bottom of the reservoir 12.

Figure 2:
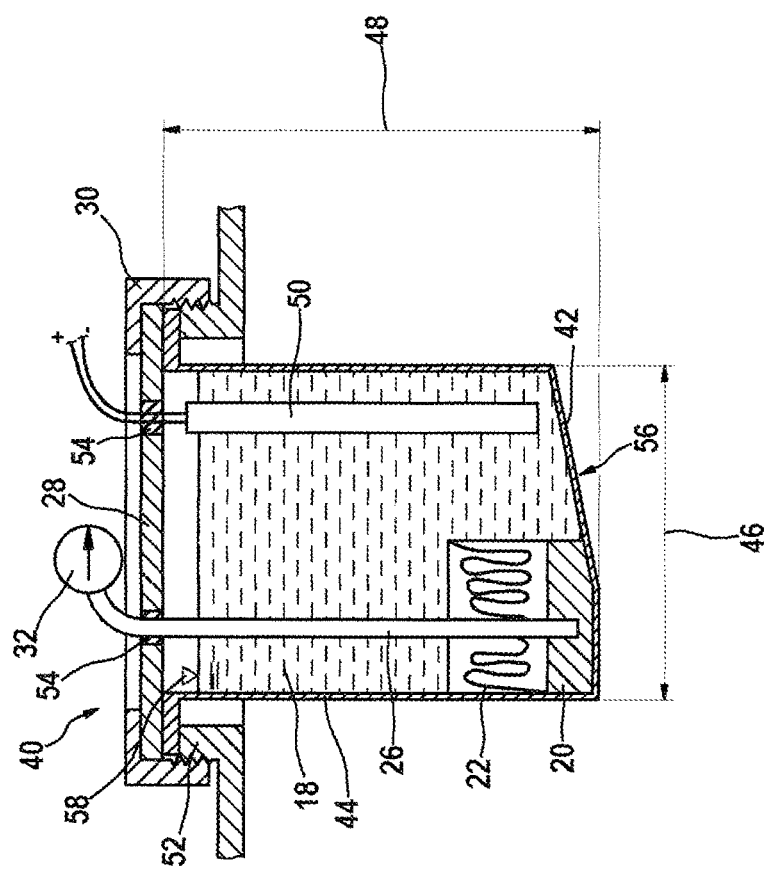
FIG. 2 shows a section through the standard reservoir proposed according to the invention, for integration on a vehicle-specific component.

FIG. 2 shows a longitudinal section through one variant embodiment of a standard reservoir proposed according to the invention for accommodating reducing agent.

The illustration in accordance with FIG. 2 shows a standard reservoir 40, in which only a volume of the order of between 2 liters and 10 liters of reducing agent 18 is held in contrast to the reservoir 12 in accordance with the illustration in FIG. 1. A level of the reducing agent 18 within the standard reservoir 40 is indicated by reference sign 58. The standard reservoir 40 in accordance with the sectioned illustration in FIG. 2 comprises a reservoir bottom 42 and a reservoir wall 44 and can, for example, be of cylindrical design or have a rectangular or square outline. In the illustration in accordance with FIG. 2, the reservoir concerned is a standard reservoir 40 of cylindrical design, a diameter of the standard reservoir 40 being indicated by reference sign 46. A length of the standard reservoir 40, which exceeds the diameter 46 thereof, is indicated by reference sign 48. Projecting into the interior of the standard reservoir 40 is a level sensor 50, the contact arrangement of which is passed to the outside via a seal 54 arranged in the cap 28. The cap 28, for its part, is secured by means of a screwed joint 30 on a vehicle-specific component, which can be a fuel tank 68, for example. A flange is preferably formed on the reservoir wall 44 at the upper end, said flange being supported on a collar 52 on the vehicle-specific component, e.g. a fuel tank 68. By means of the screwed joint 30, the cap 28 together with the flange on the reservoir wall can be connected in a simple and leaktight manner to the vehicle-specific component, e.g. a fuel tank 68. Furthermore, the suction lance 26 projects into the interior of the standard reservoir 40. The suction lance 26, which extends substantially in a vertical direction through the reducing agent 18 held in the standard reservoir 44, is likewise sealed off in the cap 28 by means of a seal 54. The delivery unit, by means of which the suction lance 26 is supplied, is merely indicated by the arrow in the illustration in accordance with FIG. 2 and is not shown in the illustration in accordance with FIG. 2.

The heating element 22 is situated in the lower region of the suction lance 26, and a filter 20 is, in turn, arranged underneath said heating element.

As can be seen from the sectioned representation in accordance with FIG. 2, the reservoir bottom 42 of the standard reservoir 40 extends at a stamping angle, giving rise to a slope 56, as a result of which it is ensured at all times that the filter 20 is wetted for as long as possible by reducing agent 18 as the reservoir empties. The filter 20 or the side of the filter 20 which faces the reservoir bottom 42 can advantageously be matched to the contour of the slope 56.

By virtue of its reduced size, the standard reservoir 40 illustrated in the illustration in accordance with FIG. 2 can be produced by means of an inexpensive plastics injection molding process or, alternatively, by the centrifugal plastics molding process. Moreover, the reduced size of the standard reservoir 40 proposed according to the invention for integration in or on a vehicle-specific component means that the anti-surge pot 16 (cf. illustration in accordance with FIG. 1) which inhibits the sloshing movements of the reducing agent 18 can be omitted. As a result, it is possible to provide standard components for integration into a dosing system 10 and, furthermore, there is now no longer a need to provide measures to counteract sloshing of the reducing agent 18 in the standard reservoir 40.

Apart from plastics material, the standard reservoir 40 illustrated in FIG. 2 can also be manufactured from stainless steel as part of the abovementioned production processes.

Figure 3:
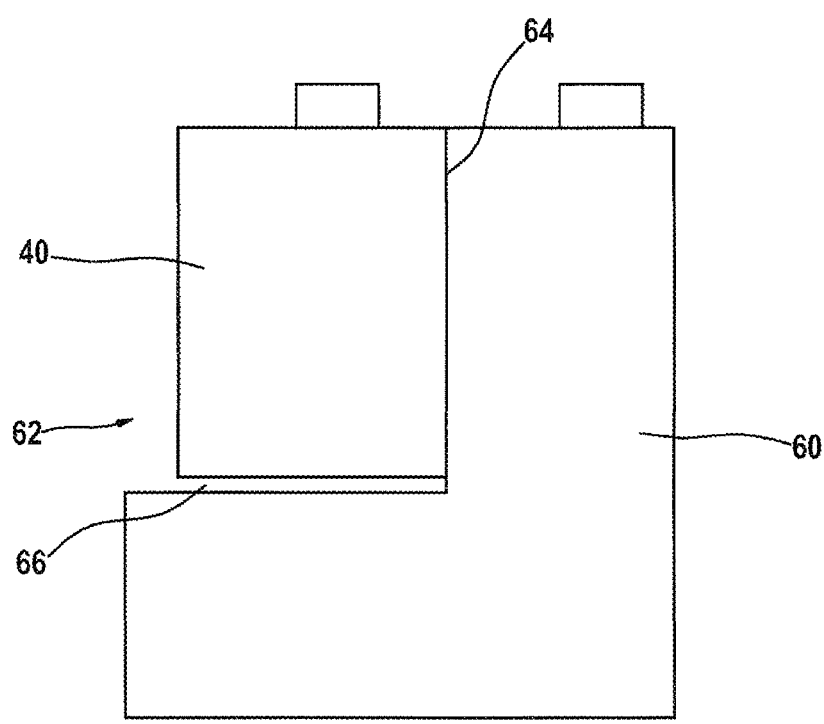
FIG. 3 shows the integration of the standard reservoir in accordance with FIG. 2 on a vehicle-specific component.

It can be seen from the illustration in accordance with FIG. 3 that the reservoir for holding the reducing agent 18, which is embodied as a standard reservoir, is integrated into a vehicle-specific component 60. The vehicle-specific component 60 can be a tank or reservoir that holds a medium, e.g. the fuel tank of the vehicle or a wash water reservoir or the like. FIG. 3 shows that the standard reservoir 40 is integrated into a free space 62 of the vehicle-specific component 60. From the schematic representation in accordance with FIG. 3, it can be seen that the free space 62 is bounded by a boundary wall 64, which is simultaneously a boundary wall of the vehicle-specific component 60, and by a bottom 66. Depending on the geometry of the standard reservoir 40, the free space 62 is formed on the vehicle-specific component 60, whether this is a wash water reservoir or the fuel tank of the vehicle. One particularly advantageous possibility is to integrate the standard reservoir 40 into the fuel tank 68 as the vehicle-specific component 60, whether by building the reservoir into the latter or forming it integrally therein or the like. With a substantial reduction in fuel consumption in vehicles, the volume of fuel that has to be stored in the fuel tank 68 is consequently reduced, thus creating installation space for the standard reservoir 40 for holding the reducing agent. According to the invention, provision is made for the volume of reducing agent 18 that is held in the standard reservoir 40 to be of the order of between 2 liters and 10 liters.

Figure 4:
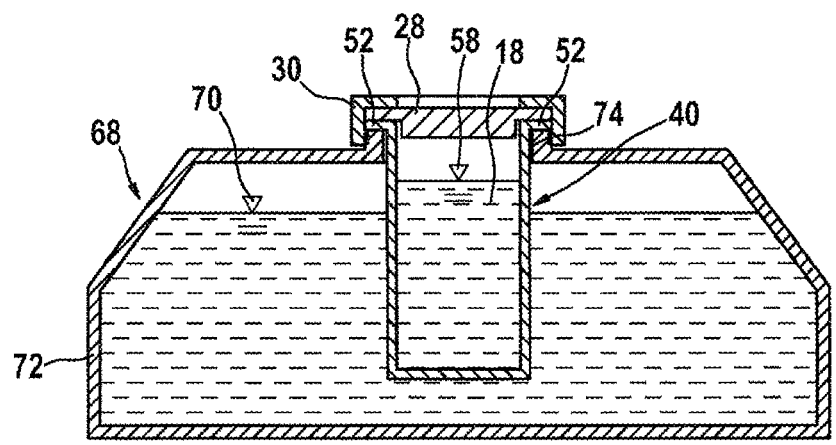
FIG. 4 shows a section through a vehicle-specific component designed as a fuel tank with a standard reducing agent reservoir accommodated in the tank.

The illustration in accordance with FIG. 4 shows a first variant embodiment of the standard reservoir proposed according to the invention in a vehicle-specific component— in this case a fuel tank.

FIG. 4 shows that a collar 52 is formed in a wall 72 of a fuel tank 68, which in this context represents the vehicle-specific component 60. Resting on the collar 52 is a flange formed in the wall 44 of the standard reservoir 40. The flange is secured on the collar 52 by means of a screwed joint 30, for example. An opening 74 in the top of the fuel tank 68 is thereby closed. FIG. 4 shows that the standard reservoir 40 in this first variant embodiment of the solution proposed according to the invention is fixed in the fuel tank 68 and is surrounded on all sides with respect to the bottom or the reservoir wall thereof by fuel. The fuel level within the fuel tank 68 is indicated by reference sign 70. The internals, such as the level sensor 50 illustrated in FIG. 2 and the suction lance 26 for carrying the reducing agent out of the interior of the standard reservoir 40, are not shown in the illustration in accordance with FIG. 4.

In the solution illustrated in FIG. 4, the standard reservoir 40 is simply inserted into the opening 74 on the upper side of the fuel tank 68 and fixed by means of the screwed joint 30. The screwed joint 30 can be a cap with a rubber seal and a large plastic nut, for example, to give one illustrative embodiment. The level of reducing agent 18 within the standard reservoir 40 is indicated by reference sign 58.

Figure 5:
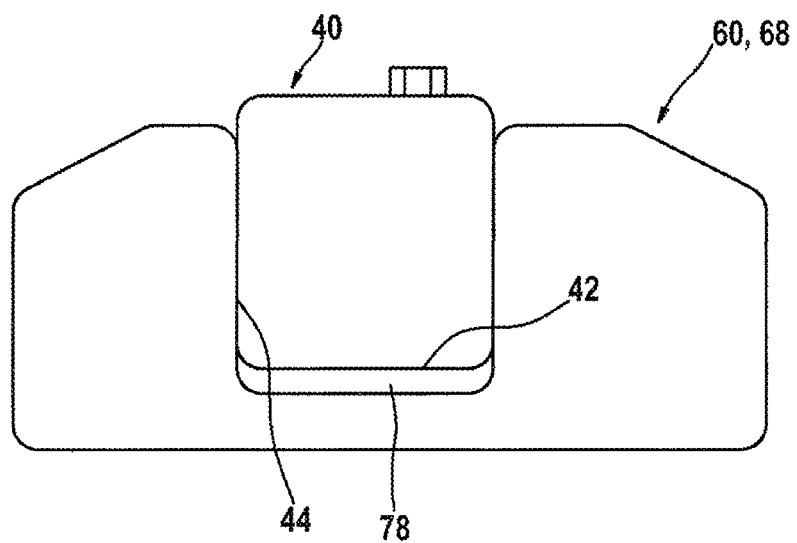
FIG. 5 shows the standard reservoir in accordance with the illustration in FIG. 2, let into the trough in a fuel tank.

In another variant embodiment, which can be seen in FIG. 5, the fuel tank 68, which is here represented as a vehicle-specific component 60, for example, has a trough 78, which can be embodied as a cylindrical indentation or the like, for example. The reservoir, which is designed as a standard reservoir 40, for accommodating the reducing agent 18 is inserted into this trough 78 and fixed. According to this variant embodiment, both the reservoir wall 44 and the reservoir bottom 42 are surrounded by adjoining boundary walls of the fuel tank 68. The geometry of the trough 78 in the fuel tank 68 depends on the geometry of the standard reservoir 40. This is preferably designed in such a way that the height thereof, cf. length 48 of the standard reservoir 40, exceeds the diameter 46 thereof, cf. illustration in accordance with FIG. 2.

Even if it is not shown in the illustration in accordance with FIG. 5, the reservoir bottom 42 of the standard reservoir 40 is preferably formed on a slope, as already explained in connection with FIG. 2.

Figure 6:
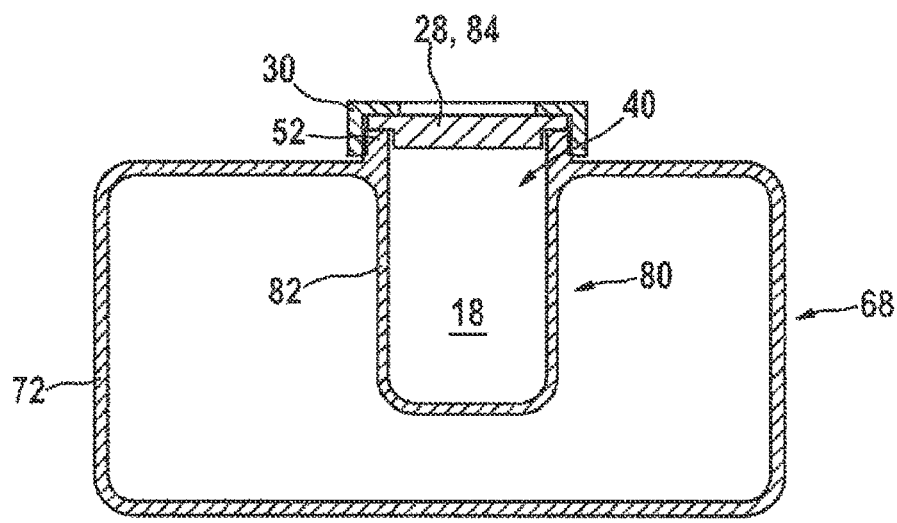
FIG. 6 shows a variant embodiment with a standard reservoir formed in the tank wall of a fuel tank, for accommodating the reducing agent.

Another possible embodiment of the solution proposed according to the invention is illustrated schematically in FIG. 6.

The solution in accordance with FIG. 6 is a vehicle-specific component 60 which is likewise designed as a fuel tank 68, in which a reservoir as an integrally formed standard reservoir 80 has already been formed in the outer skin or wall 72 of the fuel tank 68. The interior of the integrally formed standard reservoir 80 and the reducing agent 18 held therein is separated from the contents of the fuel tank 68 by a dividing wall 82. In the case of a fuel tank 68 produced by the plastics blow molding process, the dividing wall 82 forms part of the outer boundary wall 72 thereof. The opening in the integrally formed standard reservoir 80 is closed by a cap 28 or closure part 84, which can be closed in a sealing manner by means of a screwed joint 30 or the like.

Although not illustrated explicitly in the drawing in the variant embodiment illustrated in FIG. 6, the electrical contacts for the level sensor 50 pass through the cap 28 or closure part 84, cf. the illustration in accordance with FIG. 2, and the suction lance 26, which extends to the delivery unit 32, on the one hand, and into the cavity of the standard reservoir 40, on the other hand.

Figure 7:
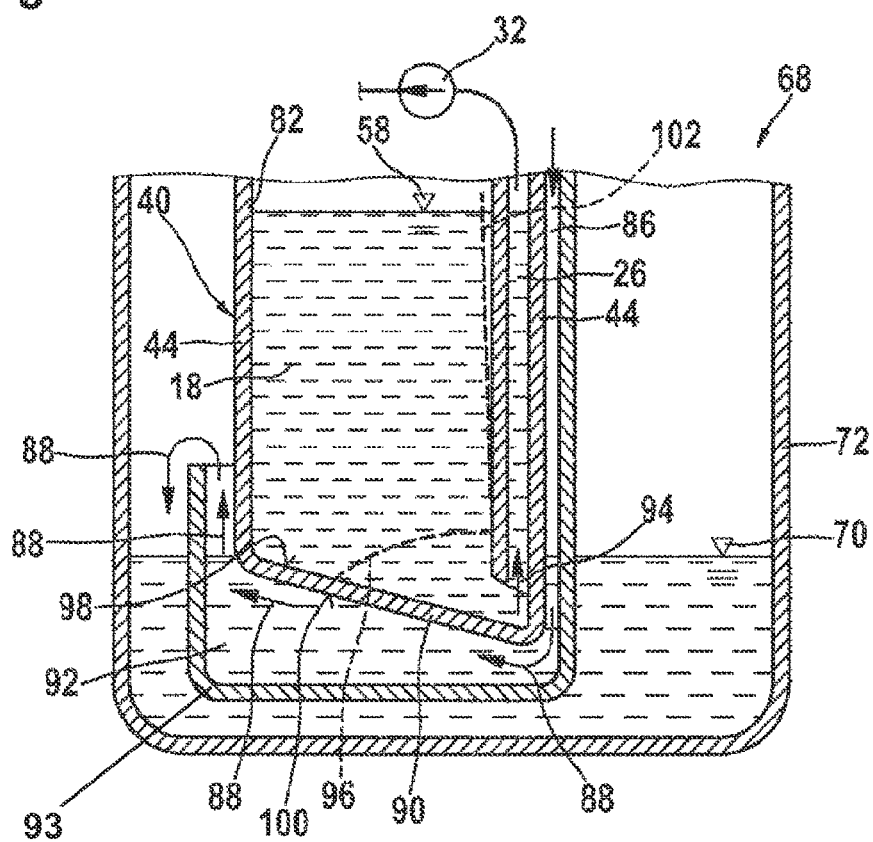
FIG. 7 shows a variant embodiment of the solution proposed according to the invention, the standard reservoir, which is intended to accommodate the reducing agent and is let into the vehicle-specific component, being warmed by returning fuel.

FIG. 7 shows a variant embodiment of the solution proposed according to the invention, in which the reducing agent held in the standard reservoir is warmed by returning fuel.

In the variant embodiment of the solution proposed according to the invention, which is illustrated in FIG. 7, the standard reservoir 40 is let into the vehicle-specific component 60, in particular the fuel tank 68 of the vehicle. It is unimportant here whether the standard reservoir 40 is inserted as an inserted part into an opening 74 in the fuel tank 68, as illustrated in FIG. 4, or whether the standard reservoir is designed as an integrally formed standard reservoir 80, i.e. formed in the wall 72 of the fuel tank 68 itself.

In the solution in the variant embodiment in accordance with FIG. 7, the fact that it is possible in this variant embodiment to dispense with the use of a separate heating element 22, as illustrated in the variant embodiment in accordance with FIG. 2, is significant. The reason for this is that the reducing agent 18 that is held in the standard reservoir 40 or in the integrally formed standard reservoir 80 is warmed by returning fuel. When fuel is injected into the combustion chambers of the internal combustion engine, there is a leakage quantity or return quantity, which is carried back to the fuel tank 68 by a return from the fuel injectors, said return being denoted by reference sign 86 in the variant embodiment in accordance with FIG. 7. This return quantity of fuel has a relatively high temperature, which can be used to warm the reducing agent 18 held in the standard reservoir 40 or integrally formed standard reservoir 80 without the need for a separate heating element 22 and the complex control system required for this purpose. In accordance with the solution proposed according to the invention, the fuel return 86 in FIG. 7 is configured in such a way that it is molded directly into the standard reservoir 40 or integrally formed standard reservoir 80 as part of the plastics injection molding process, for example.

The return 86 from the fuel injection system of the internal combustion engine preferably runs parallel to the suction lance 26 via which the reducing agent 18 flows out of the standard reservoir 40 or integrally formed standard reservoir 80 to the delivery unit 32, which is preferably designed as an electric pump.

By means of the variant embodiment which can be seen in FIG. 7, it is possible to ensure that the returning fuel passing through the return 86 simultaneously warms the suction lance 26, which extends parallel to said return and is oriented substantially in a vertical direction, and the reducing agent 18 delivered by said lance. As can be seen from the illustration in accordance with FIG. 7, the return 86 and the suction lance 26 are separated from one another by the reservoir wall 44 of the standard reservoir 40 or integrally formed standard reservoir 80. The standard reservoir 40 or integrally formed standard reservoir 80 is preferably made in such a way that it has a bottom slope 90. Extending above the lowest point of the bottom slope 90 is a screen 96, by means of which the entry of particles into the suction lance 26 and their being drawn in by the delivery unit 32 is prevented. Underneath the screen 96 and above the inside 98 of the bottom slope 90 there is an inlet opening 94 into the suction lance 26. The inlet opening 94 into the suction lance 26 is preferably above the lowest point on the inside 98 of the bottom slope 90. On the other side, the outside 100 of the bottom slope 90 faces the collecting sump 92, in which the fuel entering the bottom sump 92 via the return 86 is collected, said fuel having an increased temperature level. As illustrated in FIG. 7, the collecting sump 92 includes a collecting sump wall 93. In accordance with a direction 88 of flow of the returning fuel, the fuel entering the bottom sump 92 via the return 86 is collected in said sump before it flows into the fuel tank 86 at an outlet opening in the direction 88 of flow. The particular advantage of the variant embodiment of the solution proposed according to the invention, which is illustrated in FIG. 7, may be regarded as the fact that, on the one hand, the fuel entering the collecting sump 92 at an increased temperature via the return 86 heats the axial length of the suction lance 26 and, on the other hand, that it releases heat via the bottom slope 90 to the reducing agent 18 held in the standard reservoir 40 or integrally formed standard reservoir 80. Depending on the choice of plastics material or stainless steel material from which the standard reservoir 40 or integrally formed standard reservoir 80 is manufactured, particularly good heat transfer is obtained between the warmed fuel and the reducing agent 18. This means that it is possible to dispense completely with a separate heating element 22 and the control mechanism for the latter in the variant embodiment of the solution proposed according to the invention which is illustrated in FIG. 7.

It is particularly advantageous if, according to the variant embodiment in FIG. 7, the suction lance 26 extends in immediate proximity to the return 86 carrying warmed fuel. Ideally, both the suction lance 26 and the return 86 for the warmed fuel are already molded into the standard reservoir 40 or integrally formed standard reservoir 80 as part of the plastics injection molding process. Thus, on the one hand, the suction lance 26 is warmed or thawed and, on the other hand, an air path 102 between the suction point, i.e. the inlet opening 94 to the suction lance 26, on the one hand, and an air space above a completely frozen reducing agent 18, is formed on the reservoir wall 44 of the standard reservoir 40 or integrally formed standard reservoir 80, this air path being required for extraction by suction.

In all the variant embodiments illustrated in FIGS. 4, 5 and 6, heating of the reducing agent 18 by means of the return 86, which carries a warmed volume of fuel discharged from the fuel injection system, is possible. A particularly advantageous embodiment consists in the variant shown in FIG. 4 since this variant embodiment is the first to enable the standard reservoir 40 to be mounted in the fuel tank 68, either with the delivery unit 32 on the cap 28 or as a separate delivery module.

The replacement of the electric heating element 22 by hydraulic heating accomplished by means of the return 86 carrying warmed fuel eliminates the electric heating element 22 together with the complex monitoring system, thereby making it possible to achieve a not inconsiderable reduction in the cost of a dosing system 10 for dosing urea or an aqueous urea solution into the exhaust gas from an internal combustion engine.

In a particularly advantageous way of embodying the solution proposed according to the invention, the level sensor 50, which extends substantially in a vertical direction, can be used in the form of a standard component which can be installed as standard in any of the standard reservoirs 40 proposed according to the invention or the reservoir, proposed according to the invention, which is integrated into a vehicle-specific component 60, e.g. a fuel tank 68.

As a development of the concept underlying the invention, the return 86 from the injection system of the internal combustion engine can be routed in such a way that the return 86, via which warmed fuel is carried back into the fuel tank 68 from the injection system of the internal combustion engine, heats the delivery unit 32, which is generally designed as an electric pump, by means of warmed fuel. On the one hand, this eliminates a separate heating element for the delivery unit 32, which is generally an electrically operated pump, and, on the other hand, by means of appropriate routing of the return 86 for carrying the warmed fuel into the fuel tank 68, it is possible to ensure that not only the delivery unit 32 but also the connecting line between the dosing module 38 and the delivery unit 32, on the one hand, and, on the other hand, that region of the suction lance 26 which is situated on the upstream suction side of the delivery unit 32 can be heated. This avoids the provision of an additional heating element, e.g. a heating coil or the like, in the region of the suction lance 26, of the delivery unit 32 or between the line from the delivery end of the delivery unit 32 to the delivery module 38.

What is claimed is:

1. A dosing system for introducing a reducing agent into the exhaust tract of an internal combustion engine, the dosing system comprising a fuel tank having an outer wall, a collecting sump disposed at least partially within the fuel tank and having a wall of the collecting sump separated from the outer wall of the fuel tank, and a standard reservoir for holding the reducing agent, the standard reservoir being disposed at least partially within the fuel tank and having a wall separated from both the outer wall of the fuel tank and the wall of the collecting sump, the wall of the collecting sump being disposed between the wall of the standard reservoir and the outer wall of the fuel tank, the dosing system further comprising a delivery unit, a level sensor, and a dosing module, wherein the reducing agent held in the standard reservoir is heated by warmed fuel flowing back into the fuel tank, and returning fuel flows along the wall of the standard reservoir and collects in the collecting sump underneath the standard reservoir.

2. The dosing system as claimed in claim 1, wherein the standard reservoir holds a volume of reducing agent of between 2 liters and 10 liters.

3. The dosing system as claimed in claim 2, wherein the standard reservoir contains a heating element.

4. The dosing system as claimed in claim 1, wherein the standard reservoir is let into an opening in the fuel tank and is fixed and sealed off in the fuel tank.

5. The dosing system as claimed in claim 1, wherein the standard reservoir is formed integrally in the fuel tank.

6. The dosing system as claimed in claim 5, wherein the integrally formed standard reservoir is separated from fuel held in the fuel tank by a boundary wall, and the boundary wall is part of a wall of the fuel tank.

7. The dosing system as claimed in claim 1, wherein the delivery unit is heated by the warmed fuel flowing back in a fuel return into the fuel tank.

8. The dosing system as claimed in claim 7, wherein a suction lance for delivering reducing agent is heated by the fuel return, which carries warmed fuel.

9. The dosing system as claimed in claim 8, wherein an inlet opening of the suction lance is situated above a lowest point of a bottom slope of the standard reservoir.

10. The dosing system as claimed in claim 1, wherein the dosing system introduces one of urea and an aqueous urea solution into the exhaust tract of the internal combustion engine.

* * * * *